United States Patent Office 3,707,457
Patented Dec. 26, 1972

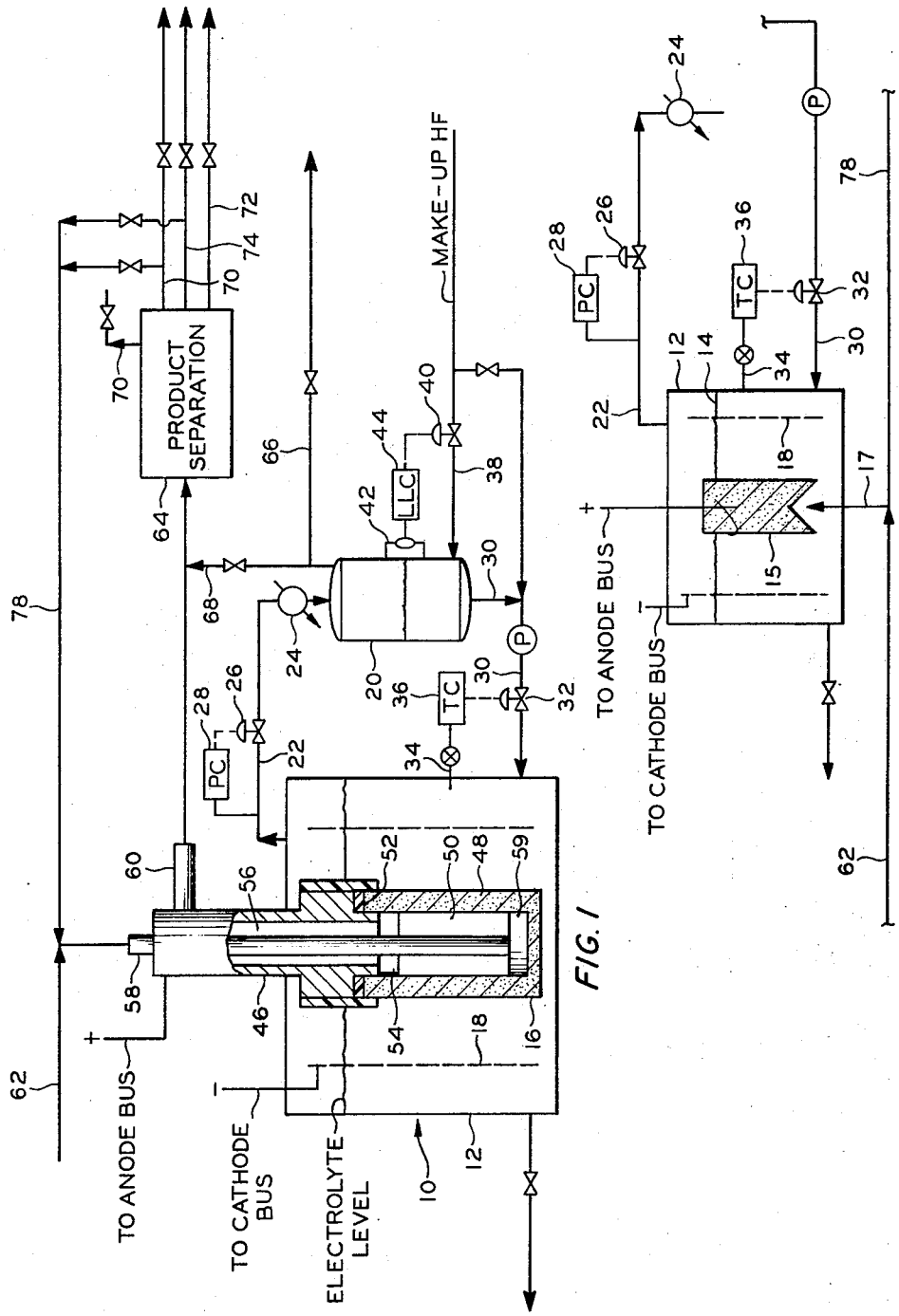

3,707,457
APPARATUS FOR CONTROLLING THE TEMPERATURE OF THE ELECTROLYTE IN AN ELECTROLYTIC CELL
Lyle W. Pollock, Bartlesville, Okla., assignor to Phillips Petroleum Company
Original application Oct. 7, 1968, Ser. No. 765,301, now Patent No. 3,582,482. Divided and this application Feb. 19, 1971, Ser. No. 116,815
Int. Cl. B01k 3/00
U.S. Cl. 204—278          5 Claims

ABSTRACT OF THE DISCLOSURE

Electrochemical conversion apparatus comprising a combination of elements for controlling the temperature of the electrolyte in an electrolytic cell, including pressure control means for the cell to control the pressure on the cell and hence the boiling point of the electrolyte.

---

This application is a division of copending application Ser. No. 765,301, filed Oct. 7, 1968, now Pat. No. 3,582,482.

In one aspect this invention relates to apparatus for controlling the temperature in an electrochemical fluorination process.

Electrochemical fluorination processes for converting a wide variety of feedstocks into desirable fluorinated products are known in the art. In such processes it is often desirable to control the reaction temperature at a desired value or at least within a narrow range of temperature. Such temperature control is frequently accomplished by controlling the electrolyte temperature. Such temperature control sometimes becomes quite difficult due to $I^2R$ losses within the electrolyte, coupled with the unavoidable heat of reaction. It is known to cool electrolytic cells by circulating various coolants in coils or tubes in indirect heat exchange with the electrolyte. However, the most convenient coolant, water, frequently reacts violently with the electrolyte when leakage of the coolant occurs. In many cells there is also the danger of contaminating the products of the process with the coolant or with products of the reaction between the coolant and the electrolyte. Leakage of cooling water into the electrolyte is not an uncommon occurrence in view of the thin-walled cooling tubes employed and the corrosiveness of some cooling waters and some electrolytes.

The present invention provides an apparatus for controlling temperature in an electrochemical fluorination process using a current-conducting essentially anhydrous hydrogen fluoride electrolyte which eliminates or at least mitigates the above-described difficulties.

An object of this invention is to provide an apparatus for controlling the temperature in an electrochemical conversion process. Other aspects, objects, and advantages of the invention will be apparent to those skilled in the art in view of this disclosure.

Thus, according to the invention, there is provided electrochemical conversion apparatus comprising, in combination: an electrolytic cell containing a vaporizable electrolyte; a vapor-liquid separation means; a first conduit means connecting said cell and said separation means for passing a cell effluent stream comprising electrolyte vapors from said cell to said separation means; condensing means disposed in said first conduit means; and a pressure control means disposed in said first conduit means, upstream from said condensing means, for controlling flow therethrough so as to maintain an essentially constant back pressure on said cell and maintain said electrolyte essentially at its boiling point.

A number of advantages are realized or obtained in the practice of the invention. By eliminating the necessity for circulating a coolant, such as water, in indirect heat exchange with the electrolyte, all danger of leaks of coolant into the electrolyte are eliminated. Thus, there is no danger of any reaction between a coolant and the electrolyte. Similarly, all dangers of contaminating the electrolyte and/or the cell product with a coolant material are eliminated. Another advantage is the elimination of temperature gradients in the electrolyte, such as can occur when cooling coils or other cooling means are employed. Thus, a more uniform temperature can be maintained throughout the electrolyte.

The invention is applicable to any electrochemical fluorination process employing an electrolyte comprising essentially anhydrous hydrogen fluoride and wherein it is desired to remove heat of reaction from the system. The invention is particularly applicable to those processes and systems wherein close temperature control within a narrow range is desirable. In the practice of one embodiment of the invention, the pressure within the electrolytic cell is controlled so that the electrolyte boils at the desired cell operating temperature. If desired, the boiling point of the electrolyte can be further controlled by varying the composition of the electrolyte, as discussed further hereinafter. In a presently more preferred embodiment of the invention, control of the cell pressure and thermal control of the electrolyte composition are employed in combination to maintain the boiling point of the electrolyte within the cell essentially constant over a narrow range. As will be understood by those skilled in the art in view of this disclosure, actual operating conditions within a typical electrolytic cell depend largely upon cell design and considerations of thermodynamics and economic factors for the particular process being utilized. Consequently, said operating conditions can vary widely depending upon the particular fluorination process.

The invention is applicable to a wide variety of electrochemical fluorination processes. The invention is particularly applicable to electrochemical fluorination processes in which porous anodes are employed. In one presently preferred process a current-conducting essentially anhydrous liquid hydrogen fluoride electrolyte is electrolyzed in an electrolysis cell provided with a cathode and a porous anode (preferably porous carbon), a fluorinatable feedstock is introduced into the pores of said anode and at least a portion of said feedstock is at least partially fluorinated within the pores of said anode, and fluorinated products are recovered from the cell.

Very few organic compounds are resistant to fluorination. Consequently, a wide variety of feed materials, both normally liquid and normally gaseous compounds, can be used as feedstocks in said process. Organic compounds which are normally gaseous or which can be introduced in gaseous state into the pores of a porous anode under the conditions employed in the electrolysis cell, and which are capable of reacting with fluorine, are presently preferred as starting materials. However, starting materials which are introduced into the pores of the anode in liquid state can also be used. Generally speaking, desirable organic starting materials which ban be used are those containing from 1 to 8, preferably 1 to 6, carbon atoms per molecule. However, reactants which contain more than 6 or 8 carbon atoms can also be used. Some general types of starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. The presently more preferred starting materials are the normally gaseous organic compounds, and particularly the saturated and unsaturated hydrocarbons, containing from 1 to 4 carbon atoms per molecule.

Since fluorine is so reactive, no list of practical length could include all starting materials which can be used. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylhexene-2; butadiene; vinyl chloride; 3-fluoropropylene; acetylene; methylacetylene; vinylacetylene; 3,3-dimethylpentyne-2; allyl chloride; methylamine; ethylamine; diethylamine; 2-amino - 3 - ethylpentane; 3 - bromopropylamine; triethylamine; dimethyl ether; diethyl ether; methyl ethyl ether; methyl vinyl ether; 2-iodoethyl methyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylenebromohydrin; benzene; toluene; cumene; o-xylene; p-xylene; and monochlorobenzene.

Inorganic materials such as carbon monoxide and oxygen can also be fluorinated as described herein to yield carbonyl fluoride and oxygen difluoride, respectively.

Although the hydrogen fluoride electrolyte can contain small amounts of water, such as up to about 5 weight percent, it is preferred that said electrolyte be essentially anhydrous. Generally speaking, it is preferred that said electrolyte contain not more than about 0.1 weight percent water. However, commercial anhydrous liquid hydrogen fluoride which normally contains dissolved water in amounts ranging from a trace (less than 0.1 weight percent) up to about 1 percent by weight can be used. Thus, as used herein and in the claims, the term "essentially anhydrous liquid hydrogen fluoride," unless otherwise specified, includes liquid hydrogen fluoride which can contain water not exceeding up to about 1 weight percent. As the electrolysis reaction proceeds, any water contained in the hydrogen fluoride electrolyte is slowly decomposed and said electrolyte concomitantly approaches the anhydrous state. Hydrogen fluoride is consumed in the reaction and must be either continuously or intermittently replaced in the cell.

Pure anhydrous liquid hydrogen fluoride is nonconductive. The essentially anhydrous liquid hydrogen fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulfuric acid and phosphoric acid. Potassium fluoride is the presently most preferred additive. Said additives can be utilized in any suitable molar ratio of additive to hydrogen fluoride within the range of from 1:4.5 to 1:1 preferably 1:4 to 1:2. The presently most preferred electrolytes are those which correspond approximately to the formulas $KF \cdot 2HF$, $KF \cdot 3HF$, or $KF \cdot 4HF$. In general, said additives are not consumed in the process and can be used indefinitely. Said additives are frequently referred to as conductivity additives for convenience. Said electrolytes $KF \cdot 2HF$, $KF \cdot 3HF$, and $KF \cdot 4HF$ have boiling points of approximately 188, 132, and 80° C., respectively.

The cell body and the electrodes in the cell must be fabricated of materials which are resistant to the action of the contents of the cell under the reaction conditions. Materials such as steel, iron, nickel, polytetrafluoroethylene (Teflon), carbon, and the like, can be employed for the cell body. The cathode can be fabricated in any suitable shape or design and can be made of any suitable conducting material such as iron, steel, nickel, alloys of said metals, and carbon. The anode preferably will comprise a porous element. Said anode can be fabricated from any suitable conducting material which is compatible with the system, e.g., nickel, iron, various metal alloys, and carbon, which is not wetted by the electrolyte. By "not wetted" is meant that the contact angle between the electrolyte and the anode must exceed 90° in order that anticapillary forces will prevent substantial invasion of the small pores of the anode by the electrolyte. Porous carbon, which is economical and readily available in ordinary channels of commerce, is presently preferred for the porous element of said anode. Porous carbon impregnated with a suitable metal such as nickel can also be used as the anode. Various grades of porous carbon can be used in the practice of the invention. It is preferred to employ porous carbon which has been made from carbon produced by pyrolysis, and not graphitic carbon. Two types of commercially available porous carbon are those known commercially as Stackpole 139 and National Carbon Grade 60. Said Stackpole 139 carbon has a pore volume of about 0.2 to about 0.3 cc. per gram with the pore diameters ranging from 0.1 to 10 microns in diameter. Said National Carbon Grade 60 has a pore volume of about 0.3 to about 0.5 cc. per gram with the pore diameters ranging from 10 to 60 microns in diameter. The actual values of said pore volumes will depend upon the specific method employed for determining same. Thus, preferred porous carbons for fabricating the preferred anodes include those having a pore volume within the range of about 0.2 to about 0.5 cc. per gram with the pores ranging from 0.1 to 60 microns in diameter.

Said anode can be fabricated in any suitable shape or design, but must be arranged or provided with a suitable means for introducing the feed reactant material into the pores of the porous element itself.

Except as described above, any convenient cell configuration or electrode arrangement can be employed. The cell must be provided with a vent or vents through which by-product hydrogen can escape and through which volatile cell products can be removed and recovered. If desired or necessary, a drain can be provided on the bottom of the cell. The cell may contain an ion permeable membrane or divider for dividing the cell into an anode compartment and a cathode compartment. It is sometimes desirable to employ such a divider to prevent hydrogen generated at the cathode from mixing and reacting with the fluorinated product produced at the anode. Any conventionally known resistant divider material can be employed for this purpose.

The electrochemical fluorination can be effectively and conveniently carried out over a broad range of temperatures and pressures limited only by the freezing point and the vapor pressure of the electrolyte. Generally speaking, the fluorination process can be carried out at temperatures within the range of from about 60 to about 300° C. A presently preferred range of temperature is from about 60 to 200° C.

Pressures substantially above or below atmospheric can be employed if desired, depending upon the vapor pressure of the electrolyte at the desired cell operating conditions. In all instances, the cell pressure will be such as to maintain the electrolyte in a boiling condition. Generally speaking, the process is conveniently carried out at substantially atmospheric pressure.

The rate of direct current flow through the cell is maintained at a rate which will give the highest practical current densities for the electrodes employed. Current densities within the range of from 30 to 1000, or more, preferably 50 to 500, milliamps per square centimeter of anode geometric surface area can be used. Current densities less than 30 milliamps per square centimeter of anode geometric surface area are not practical because the rate of fluorination is too slow. The voltage which is normally employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum normal voltage will not exceed 20 volts per unit cell. Thus, as a guide, voltages in the range of 4 to 20 volts per unit cell are normally used. The term "anode geometric surface" refers to the outer geometric surface area of the porous carbon element of the anode which is exposed to electrolyte and does not include the pore surfaces of said porous element.

The feed rate of the fluorinatable feedstock being introduced into the pores of the porous carbon element of the anode is an important process variable in that, for a given current flow or current density, the feed rate controls the degree of conversion. Similarly, for a given feed rate, the amount of current flow or current density can be employed to control the degree of conversion. Feed rates which can be employed will preferably be in the range of from 0.5 to 10 milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow).

The actual feed rate employed will depend upon the type of porous materials, e.g., porous carbon, used in fabricating the porous element of the anode as well as several other factors including the nature of the feedstock, the conversion desired, current density, etc., because all these factors are interrelated and a change in one will affect the others. The feed rate will be such that the feedstock is passed into the pores of the anode, and into contact with the fluorinating species therein, at a flow rate such that the inlet pressure of said feedstock into said pores is essentially less than the sum of (a) the hydrostatic pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these preferred flow rate conditions, there is established a pressure balance between the feedstock entering the pores of the anode from one direction and electrolyte attempting to enter the pores from another and opposing direction. This pressure balance provides an important and distinguishing feature in that essentially none of the feed leaves the anode to form bubbles which escape into the main body of the electrolyte. Essentially all of the feedstock travels within the carbon anode via the pores therein until it reaches a collection zone within the anode from which it is removed via a conduit, or until it exits from the anode at a point above the surface of the electrolyte.

The more permeable carbons will permit higher flow rates than the less permeable carbons. Any suitable porous carbon which will permit operation within the limits of the above-described pressure balance can be employed in fabricating the porous element of the anode. Thus, broadly speaking, porous carbons having a permeability within the range of from 0.5 to 75 darcies and average pore diameters within the range of from 1 to 150 microns can be employed. Generally speaking, carbons having a permeability within the range of from about 2 to about 30 darcies and an average pore diameter within the range of from about 20 to about 75 microns are more preferred.

Similarly, anode shapes, anode dimensions, and manner of disposal of the anode in the electrolyte will also have a bearing on the flow rate. Thus, owing to the many different types of carbon which can be employed and the almost infinite number of combinations of anode shapes, dimensions, and methods of disposal of the anode in the electrolyte, there are no really fixed numerical limits on the flow rates which can be used. Broadly speaking, the upper limit on the flow rate will be that at which "breakout" of feedstock and/or fluorinated product begins along the immersed portion of the anode. Herein and in the claims, unless otherwise specified, "breakout" is defined as the formation of bubbles of feedstock and/or fluorinated product on the outer immersed surface of the anode with subsequently detachment of said bubbles wherein they pass into the main body of the electrolyte. Broadly speaking, the lower limit of the feed rate will be determined by the requirement to supply the minimum amount of feedstock sufficient to prevent evolution of free fluorine. As a practical guide to those skilled in the art, the feed rates can be within the range of from 3 to 600, preferably 12 to 240, cc. per minute per square centimeter of cross-sectional area (taken perpendicular to the direction of flow).

The above-described pressure balance will permit some invasion of the pores of the anode by the hydrogen fluoride electrolyte. The amount of said invasion will depend upon the inlet pressure of the feedback and the pore size. The larger size pores are more readily invaded. It has been found that porous carbon anodes as described herein can be successfully operated when up to 40 to 50 percent of the pores have been invaded by liquid HF electrolyte.

The feed material and the products obtained therefrom are retained in the cell for a period of time which is generally less than one minute. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be pyrolyzed to recover hydrogen fluoride which can be returned to the cell, if desired, By-product hydrogen can be burned to provide heat energy or can be utilized in hydrogen-consuming processes such as hydrogenation, etc.

FIG. 1 is a diagrammatic flow sheet illustrating various processing steps and combinations of apparatus which can be employed in the practice of the invention.

FIG. 2 is a diagrammatic flow sheet illustrating other processing steps and other combinations of apparatus which can be employed in the practice of the invention.

Referring to the drawings, the invention will be more fully explained. It will be understood that said drawings are diagrammatic and many items of equipment, e.g., valves, pumps, control apparatus, etc., not necessary for explanation of the invention, have been omitted for the sake of brevity. In FIG. 1, there is illustrated an electrolytic cell designated generally by the reference numeral 10. Said cell comprises a container 12 which can be any type of container suitable for containing the electrolyte 14 and adapted for carrying out the process of the invention. An anode 16 is disposed within said cell. A cathode 18 is also disposed within said cell. A vapor-liquid separator means 20 is disposed adjacent said cell 10. A first conduit means 22 is connected to an upper portion of said cell 10 and to said vapor-liquid separator 20 for passing a stream comprising electrolyte vapors from said cell to said separator. A condensing means 24 is disposed in said first conduit means. Said condensing means can comprise any type of condensing means suitable for the service intended. For example, said condensing means can comprise an arrangement of water-cooled condenser for partially cooling the stream in conduit 22 followed by an arrangement of refrigerated condensers for further cooling said stream. A pressure control means, here illustrated as comprising a motor valve 26, is disposed in said first conduit means 22 upstream from said condensing means 24. A pressure controller 28 is operatively connected into said first conduit means 22 and to said motor valve 26 in conventional manner and, together with said valve 26, can be employed to control the flow of vapors from container 12 and maintain an essentially constant back pressure therein. A second conduit means 30 is connected to said container 12 and said separator means 20 for returning liquid electrolyte to said container 12. A flow control valve 32 is disposed in said second conduit means. A temperature sensing means 34 extends into said electrolyte 12 for measuring the temperature of said electrolyte. A temperature controller 36 is operatively connected to said temperature sensing means 34 and said valve 32 in conventional manner and can be employed to control the adjustment of said valve 32 responsive to the temperature sensed by temperature sensing means 34.

A third conduit means 38 is connected to said separator 20 for introducing make-up electrolyte thereto. A flow control valve 40 is disposed in said third conduit means. A liquid level indicator 42 and a liquid level controller 44 are operatively connected to said separator 20 and to said valve 40 for controlling the flow of make-up electrolyte through said conduit means responsive to the level of electrolyte in said separator 20.

Said anode 16 can be any suitable type of anode and can be fabricated in any desired shape, e.g., rectangular, cylindrical, or other suitable shape. Said anode is preferably comprised of a porous material such as porous carbon. As here illustrated, said anode comprises a generally tubular conductor and current collector 46 which provides support for porous element or member 48, here shown to be a generally cylindrical member closed at one end thereof and open at the other end. One end portion 50 of said tubular conductor 46 is formed with a reduced cross section. A shoulder surrounds the upper end of said reduced cross section portion 50. If desired, a suitable gasket material 52 can be inserted between said shoulder and the upper end of porous element 48. A vent 54 extends through the wall of said portion of reduced cross section 50. Said vent 54 can comprise a plurality of holes drilled through portion 50 into communication with annular space 56. A conduit 58 extends through said tubular conductor 46, out the lower portion 50 thereof, and forms said annular space 56 within said tubular conductor. Said porous element 48 is mounted on said reduced cross section portion 50 against said shoulder and gasket material 52, and covers said vent 54. An exit conduit 60, in communication with said annular space 56, extends outwardly from the upper portion of said conductor and current collector 46.

Said cathode 18 is here illustrated as being a circular screen of a suitable metal, such as iron or steel, surrounding said anode 16. Any suitable type of cathode means can be employed in the practice of the invention. Said anode and said cathode are each connected to a suitable source of electric current.

In one presently preferred method of operation an electrolyte boiling at about 100° C. at essentially atmospheric pressure is placed in container 12 and heated to its boiling point by means not shown. A feedstock, preferably prevaporized, is introduced via conduit 62, passed through conduit 58 into space 59 in the bottom of anode 16, enters the pores of porous element 48, flows upwardly within said pores, and exits from said element 48 at vent 54 into annular space 56. During the passage of said feedstock within the pores of said element 48 it is at least partially fluorinated. Fluorinated products, together with any unconverted feedstock, exit through said exit conduit 60 and are passed into product separation means 64. A stream comprising electrolyte vapors is withdrawn via conduit 22, passed through condensing means 24, and into vapor-liquid separator 20. Valve 26, controlled by pressure controller 28, maintains an essentially constant back pressure on container 12 so as to maintain said electrolyte at its boiling point. Condensed hydrogen fluoride is withdrawn from separator 20 via conduit 30 and returned to container 12. The flow rate of said returned hydrogen fluoride is controlled by means of valve 32 and temperature controller 36 responsive to the temperature measured by temperature sensor 34. Make-up hydrogen fluoride is supplied to separator 20 via conduit 38 at a rate controlled by valve 40, liquid level sensor 42, and liquid level controller 44. Vapors from separator 20, e.g., hydrogen produced at the cathode, can be vented from separator 20 via conduit 66, or passed via conduit 68 into product separation means 64. Said product separation means can comprise any suitable means such as fractional distillation, fractional crystallization, etc., for separating the cell products. Hydrogen can be withdrawn therefrom via conduit 70. Desired converted products can be withdrawn via conduit 72, partially converted products can be withdrawn via conduit 74, and unconverted feedstock can be withdrawn via conduit 76. As shown, partially converted and/or unconverted feedstock can be passed by means of the manifolding arrangements shown and conduit 78 into conduit 58 for recycle to the process.

Referring now to FIG. 2, wherein like reference numerals are employed to denote like elements of apparatus, there is illustrated another cell arrangement which can be employed in the practice of the invention. In FIG. 2, the anode 15 comprises a cylinder of porous carbon having a cavity formed in the bottom portion thereof. Feedstock is introduced into the pores of said anode from conduit 17, travels upward through said anode, and exits from the upper end thereof above the level of electrolyte 14. During passage through said anode at least a portion of said feedstock is converted as described above in connection with FIG. 1. Conversion products together with any remaining unconverted feedstock, and hydrogen fluoride vapors, are withdrawn from the space above electrolyte 14 within container 12 via conduit 22. The stream in conduit 22 is passed through condensing means 24 into a vapor-liquid separator similarly as in FIG. 1. Condensed hydrogen fluoride is returned to container 12 via conduit 30, controlled by valve 32, similarly as in FIG. 1. Fluorinated products and unconverted feedstock are passed from the vapor-liquid separator to a product separation means and separated similarly as described above in connection with FIG. 1.

While the cell illustrated in the drawings has been simplified by having one anode means and one cathode means, it will be understood that a plurality of anodes and a plurality of cathodes, disposed in either one container or a plurality of containers, can be employed in the practice of the invention. Also, as will be understood by those skilled in the art in view of this disclosure, the actual operating conditions employed in any particular cell system will depend upon the cell system, the electrolyte composition, and the feedstock being supplied thereto. For example, and by way of further illustration of the invention, typical operating conditions for the electrochemical fluorination of 1,2-dichloroethane to 1,2-dichlorotetrafluoroethane using an essentially anhydrous electrolyte having a composition intermediate KF·3HF and KF·4HF include the following: electrolyte temperature, about 100° C.; cell pressure, substantially atmospheric; separator 20 pressure, about 1 atmosphere; and separator 20 temperature, about −50° C.

The following example will serve to further illustrate the invention.

EXAMPLE

A run is carried out for the electrochemical fluorination of 1,2-dichloroethane to 1,2-dichlorotetrafluoroethane in a system embodying the essential features of the system illustrated in FIG. 1 and using an electrolyte having a composition intermediate $KF \cdot 3HF$ and $KF \cdot 4HF$. Porous carbon cylinders having cavities in the bottoms thereof are employed as anodes. Prevaporized 1,2-dichloroethane feedstock and recycle feedstock vapors are introduced via conduit 58 at a vapor feed rate corresponding to 0.36 milliliter per minute per cm.$^2$ of anode geometric area. The conversion is carried out at an electrolyte temperature of 100° C., employing a current level of 93,000 amperes, a current density of 200 milliamps per cm.$^2$ of anode geometric area, and a voltage of 6 to 8 volts. Separator 20 temperature is about $-50°$ C. The cell pressure and the pressure in separator 20 are substantially atmospheric. Under these conditions the temperature of the boiling electrolyte 14 is maintained at 100° C. $\pm 1°$ C. A material balance for the system is set forth in the table below.

TABLE

| Stream | Conduit No. | Quantity, lbs./hr. |
|---|---|---|
| Fresh feedstock | 62 | 100 |
| Recycle feedstock | 78 | 125 |
| Total feedstock | 58 | 225 |
| Make-up HF | 38 | 80 |
| HF to Cell 10 | 30 | 2,000 |
| Hydrogen | 66 | 12 |
| 1,2-dichlorotetrafluoroethane product | 72 | 130 |

While certain embodiments of the invention have been described for illustrative purposes, the invention is not limited thereto. Various other modifications of the invention will be apparent to those skilled in the art in view of this disclosure. Such modifications are within the spirit and scope of the disclosure.

I claim:

1. Electrochemical conversion apparatus comprising, in combination: an enclosed electrolytic cell suitable for containing a vaporizable electrolyte; a vapor-liquid separation means; a first conduit means connecting said cell and said separation means for passing a cell effluent stream comprising electrolyte vapors from said cell to said separation means; condensing means disposed in said first conduit means; and a pressure control means disposed in said first conduit means upstream from said condensing means, for controlling flow therethrough so as to maintain an essentially constant back pressure on said cell and maintain said electrolyte essentially at its boiling point.

2. Electrochemical conversion apparatus in accordance with claim 1, comprising, in further combination: a second conduit means connecting said separation means and said cell for returning liquid electrolyte to said cell; and a flow control means disposed in said second conduit means.

3. Electrochemical conversion apparatus in accordance with claim 2, comprising, in further combination: a third conduit means connected to said separation means for introducing make-up electrolyte thereto; a flow control valve in said third conduit means; and a liquid level control means operatively connected to said separation means and said flow control valve for controlling the flow of make-up electrolyte through said third conduit means responsive to the level of electrolyte in said separation means.

4. Electrochemical conversion apparatus in accordance with claim 2, comprising, in further combination: temperature sensing means for measuring the temperature of said electrolyte in said cell; and temperature controller means operatively connected to said temperature sensing means and said flow control means for adjusting said flow control means and controlling the flow of electrolyte to said cell responsive to said temperature measurement.

5. Electrochemical conversion apparatus in accordance with claim 4, comprising, in further combination: a third conduit means connected to said separation means for introducing make-up electrolyte thereto; a flow control valve in said third conduit means; and a liquid level control means operatively connected to said separation means and said flow control valve for controlling the flow of make-up electrolyte through said third conduit means responsive to the level of electrolyte in said separation means.

References Cited

UNITED STATES PATENTS

| 2,984,081 | 5/1961 | Hahn | 204—239 |
| 3,450,622 | 6/1969 | Cothran | 204—275 |
| 3,551,307 | 12/1970 | Gray | 204—275 |
| 2,536,912 | 1/1951 | Corbett | 204—239 |

JOHN H. MACK, Primary Examiner

W. I. SOLOMON, Assistant Examiner

U.S. Cl. X.R.

204—239, 241, 274